(12) United States Patent
Yen

(10) Patent No.: US 7,986,130 B2
(45) Date of Patent: Jul. 26, 2011

(54) BATTERY MODULE AND CHARGE AND DISCHARGE METHOD THEREOF

(75) Inventor: Wei-Ting Yen, Taipei (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 851 days.

(21) Appl. No.: 12/000,488

(22) Filed: Dec. 13, 2007

(65) Prior Publication Data

US 2009/0027008 A1  Jan. 29, 2009

(30) Foreign Application Priority Data

Jul. 24, 2007  (TW) ................................ 96126994 A

(51) Int. Cl.
  *H02J 7/04* (2006.01)
  *H02J 7/00* (2006.01)
(52) U.S. Cl. .................. 320/150; 320/134; 320/136
(58) Field of Classification Search .............. 320/150, 320/134, 135, 136, 152, 153
  See application file for complete search history.

(56) References Cited

U.S. PATENT DOCUMENTS

| 4,430,681 | A | * | 2/1984 | Benzing ........................ 361/27 |
| 5,070,932 | A | * | 12/1991 | Vlasak ......................... 165/240 |
| 5,493,199 | A | * | 2/1996 | Koenck et al. ................. 320/106 |
| 6,377,429 | B1 | * | 4/2002 | Descombes ................... 361/93.8 |
| 6,714,882 | B1 | | 3/2004 | Iwaizono |
| 6,771,042 | B2 | | 8/2004 | Chen et al. |
| 7,375,498 | B2 | * | 5/2008 | Yamamoto .................... 320/150 |
| 7,492,126 | B2 | | 2/2009 | Hogari et al. |
| 7,514,904 | B2 | * | 4/2009 | Marchand et al. ............ 320/150 |
| 7,656,130 | B2 | * | 2/2010 | Sakakibara ................... 320/150 |
| 2005/0073282 | A1 | | 4/2005 | Carrier et al. |
| 2006/0119322 | A1 | * | 6/2006 | Maleki et al. ................. 320/150 |

FOREIGN PATENT DOCUMENTS

| TW | 439311 B | 6/2001 |
| TW | 468296 B | 12/2001 |
| TW | 471194 B | 1/2002 |
| TW | 530429 B | 5/2003 |
| TW | I237703 B | 8/2005 |
| WO | WO-92/16991 A1 | 10/1992 |
| WO | WO-94/07294 A1 | 3/1994 |
| WO | WO-2005/034604 A2 | 4/2005 |

\* cited by examiner

*Primary Examiner* — Richard V Muralidar
(74) *Attorney, Agent, or Firm* — Rabin & Berdo, P.C.

(57) ABSTRACT

A battery module and a charge/discharge method thereof are provided. The battery module comprises a cell, a charge/discharge circuit, a temperature sensing circuit and a charge/discharge speed controlling circuit. The charge/discharge circuit is coupled to the cell. The temperature sensing circuit further comprises a temperature coefficient (PTC) device used for sensing a temperature of the cell, so that the temperature sensing circuit outputs a first analog signal according to the temperature of the cell. The charge/discharge speed controlling circuit, according to the first analog signal, outputs a control signal to the charge/discharge circuit to adjust a charge/discharge speed of the cell.

12 Claims, 5 Drawing Sheets

320

330

BATTERY MODULE AND CHARGE AND DISCHARGE METHOD THEREOF

This application claims the benefit of Taiwan application Serial No. 96126994, filed Jul. 24, 2007, the subject matter of which is incorporated herein by reference.

BACKGROUND OF THE INVENTION

1. Field of the Invention

The invention relates in general to a battery module and a charge/discharge method thereof, and more particularly to a battery module and a charge/discharge method thereof capable of sensing cell temperature by a positive temperature coefficient (PTC) device for appropriately adjusting the charge/discharge speed.

2. Description of the Related Art

With the rapid advance in electronic technology, various electronic devices are provided and used in people's business as well as leisure activities. Electronic devices have brought great convenience to the users. Electronic devices are powered by a battery module.

Referring to FIG. 1, a block diagram of a conventional battery module is shown. Conventional battery module 10 comprises a cell 110 and a charge/discharge circuit 140, wherein the cell 110 is a Li-Ion battery for example. The charge/discharge circuit 140 is coupled to the cell 110, and the cell 110 is charged by an external power received via the charge/discharge circuit 140. Also, the cell 110 provides power to an external electronic device via the charge/discharge circuit 140.

Referring to FIG. 2, a measured wave pattern of the voltage, the current and the temperature of a cell 110 is shown. The curve 210 denotes the temperature of the cell 110, the curve 220 denotes the voltage at the two ends of the cell 110, and the curve 230 denotes the current flowing through the cell 110.

The cell 110 is charged by the charge/discharge circuit 140 according to a constant current and constant voltage charge method. That is, the cell 110 is charged by a constant current first. Next, when the voltage at the two ends of the cell 110 reaches a constant voltage, the charge/discharge circuit 140 stops charging the cell 110. Afterwards, the current flowing through the cell 110 reduces to a minimum and gradually approaches 0.

However, such control method may easily result in an overheated and burnt cell. Besides, when the temperature is too high, the cell may even explode, further jeopardizing safety of use.

SUMMARY OF THE INVENTION

The invention is directed to a battery module and a charge/discharge method thereof capable of sensing cell temperature by a positive temperature coefficient (PTC) device, so that the charge/discharge speed is appropriately adjusted, not only avoiding the cell being overheated and burnt down but also preventing the cell 310 from exploding, hence improving safety of use.

According to a first aspect of the present invention, a battery module is provided. The battery module comprises a cell, a charge/discharge circuit, a temperature sensing circuit and a charge/discharge speed controlling circuit. The charge/discharge circuit is coupled to the cell. The temperature sensing circuit further comprises a temperature coefficient (PTC) device used for sensing a temperature of the cell, so that the temperature sensing circuit outputs a first analog signal according to the temperature of the cell. The charge/discharge speed controlling circuit, according to the first analog signal, outputs a control signal to the charge/discharge circuit to adjust a charge/discharge speed of the cell.

According to a second aspect of the present invention, a method for charging/discharging a battery module is provided. The battery module comprises a cell, a charge/discharge circuit, a temperature sensing circuit and a charge/discharge controlling circuit. The charge/discharge method comprises the following steps:

Firstly, a positive temperature coefficient (PTC) device is provided for sensing a temperature of the cell. Next, the temperature sensing circuit outputs a first analog signal according to the temperature of the cell. Lastly, the charge/discharge controlling circuit, according to the first analog signal, outputs a control signal to the charge/discharge circuit to adjust a charge/discharge speed of the cell.

The invention will become apparent from the following detailed description of the preferred but non-limiting embodiments. The following description is made with reference to the accompanying drawings.

DETAILED DESCRIPTION OF THE INVENTION

Figure 1:
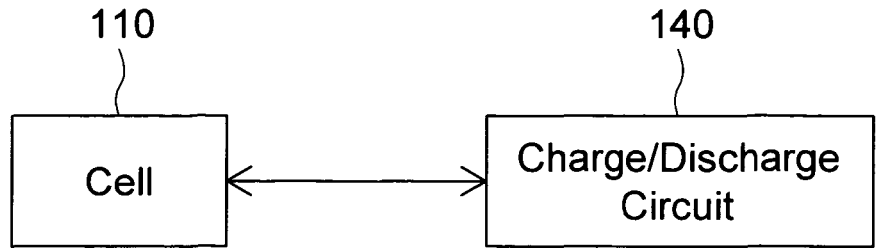
FIG. 1 (Prior Art) is a block diagram of a conventional battery module.
Figure 2:
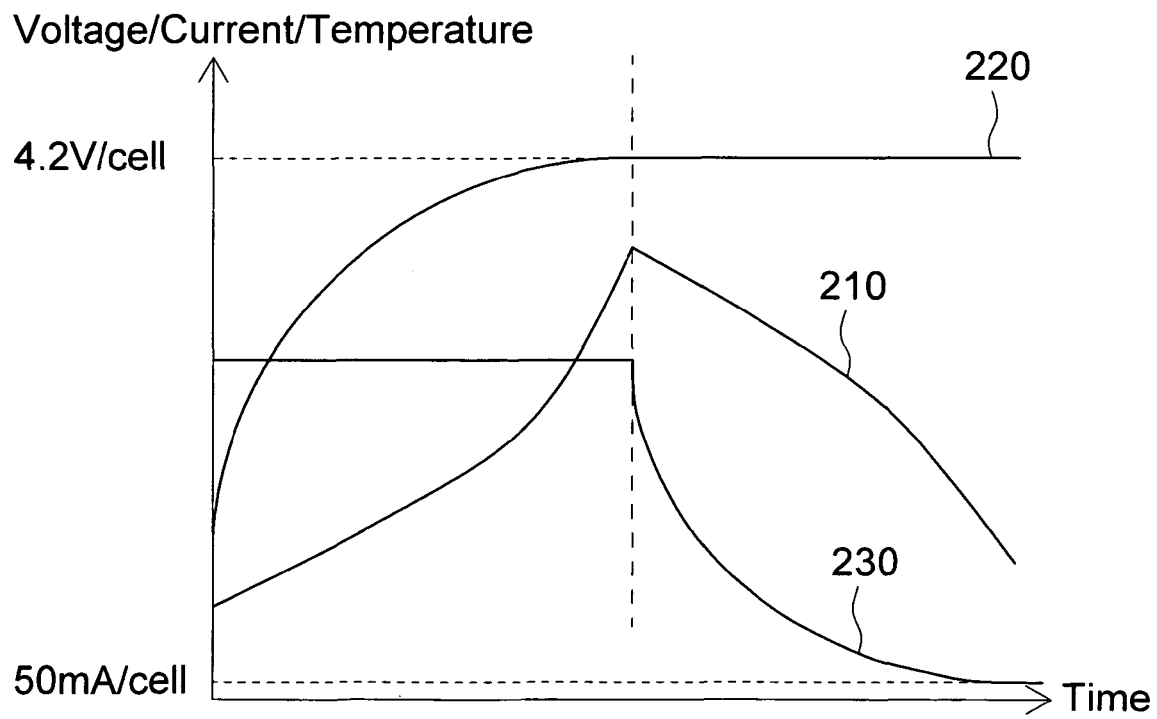
FIG. 2 (Prior Art) is a measured wave pattern of the voltage, the current and the temperature of a cell 110.
Figure 3:
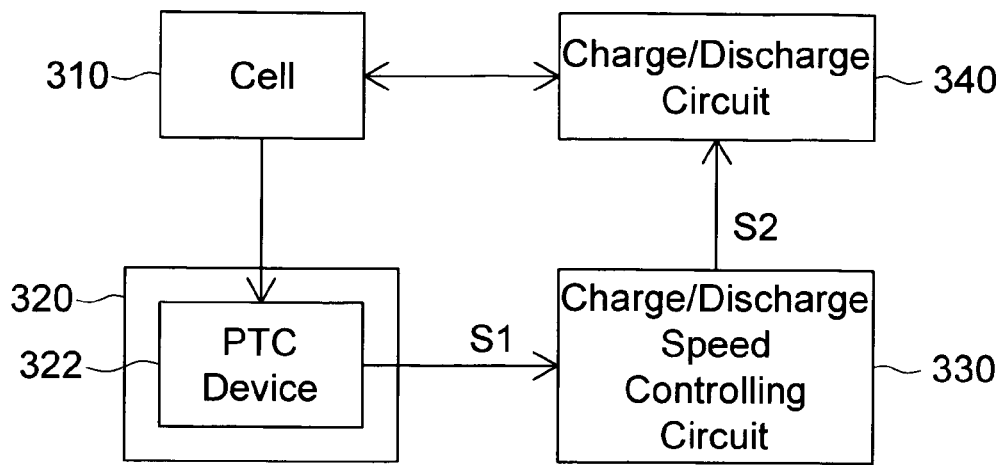
FIG. 3 is a block diagram of a battery module according to a preferred embodiment of the invention.

Referring to FIG. 3, a block diagram of a battery module according to a preferred embodiment of the invention is shown. The battery module 30 comprises a cell 310, a temperature sensing circuit 320, a charge/discharge speed controlling circuit 330 and a charge/discharge circuit 340. The cell 310 is a Li-Ion battery for example. The charge/discharge circuit 340 is coupled to the cell 310, wherein the cell 310 is charged by an external power received via the charge/discharge circuit 340. Also, the cell 310 provides a power to an external electronic device via the charge/discharge circuit 340.

The temperature sensing circuit 320 further comprises a positive temperature coefficient (PTC) device 322. The positive temperature coefficient (PTC) device 322 is used for sensing a temperature of the temperature of the cell 310, so that the temperature sensing circuit 320 outputs an analog signal S1 according to the temperature of the cell 310. The charge/discharge speed controlling circuit 330 outputs a control signal S2 to the charge/discharge circuit 340 according to the analog signal S1, wherein the charge/discharge circuit 340 adjusts a charge/discharge speed of the cell 310 according to the control signal S2.

Generally speaking, the charge/discharge speed of the cell is denoted by 1 C, 0.5 C, 0.1 C and so on. For example, when a 1000 mAh cell is charged by a 1000 mA current, the charge/ discharge speed is 1 C; when a 1000 mAh cell is charged by a 500 mA current, the charge/discharge speed is 0.5 C. Similarly, when a 1000 mAh cell is charged by a 100 mA current, the charge/discharge speed is 0.1 C.

The battery module 30 senses a temperature of the cell 310 via the PTC device 322, so that the charge/discharge speed of the cell 310 is appropriately adjusted according to the temperature, not only avoiding the cell 310 being overheated and burnt down but also preventing the cell 310 from exploding, hence improving safety of use.

Figure 4:
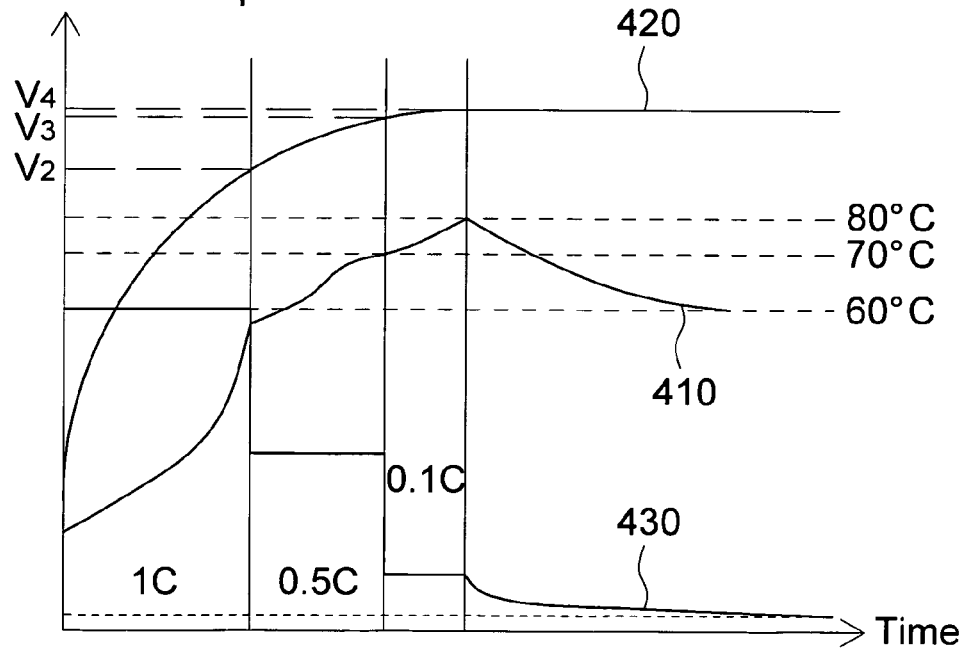
FIG. 4 is a measured wave pattern of the voltage, the current and the temperature of a cell 310.

Referring to FIG. 4, a measured wave pattern of the voltage, the current and the temperature of a cell 310 is shown. The curve 410 denotes the temperature of the cell 310, the curve 420 denotes the voltage at the two ends of the cell 310, and the curve 430 denotes the current of the cell 310.

When the temperature of the cell 310 falls below 60° C., the charge/discharge speed controlling circuit 330 controls the charge/discharge circuit 340 to fast charge the cell 310 at a charge/discharge speed of 1 C. Meanwhile, the temperature rises up fast, and the voltage at the two ends of the cell 310 correspondingly rises up to the voltage V2.

Then, when the temperature of the cell 310 is equal to or above 60° C. but below 70° C., the charge/discharge speed controlling circuit 330 controls the charge/discharge circuit 340 to normally charge the cell 310 at a charge/discharge speed of 0.5 C. Meanwhile, the temperature rises up slowly, and the voltage at the two ends of the cell 310 rises up to the voltage V3 from the voltage V2.

Afterwards, when the temperature of the cell 310 is equal to or above 70° C. but below 80° C., the charge/discharge speed controlling circuit 330 controls the charge/discharge circuit 340 to slowly charge the cell 310 at a charge/discharge speed of 0.1 C. Meanwhile, temperature rises up even slower, and the voltage at the two ends of the cell 310 rises up to the voltage V4 from the voltage V3.

Lastly, when the temperature of the cell 310 is equal to or above 80° C., as the cell 310 is fully charged, the charge/discharge speed controlling circuit 330 controls the charge/discharge circuit 340 to stop charging the cell 310. The current flowing through the cell 310 will be reduced to a minimum and gradually approaches 0.

Figure 5:
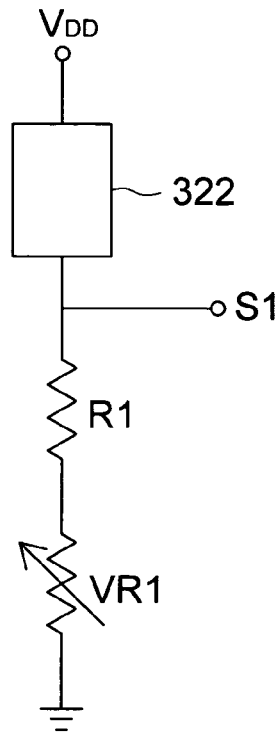
FIG. 5 is a detailed circuit diagram of a temperature sensing circuit 320.

Referring to FIG. 5, a detailed circuit diagram of a temperature sensing circuit 320 is shown. The temperature sensing circuit 320 comprises a PTC device 322, a resistor R1 and a variable resistor VR1, wherein the first resistor R1, the variable resistor VR1 and the PTC device 322 are connected in serial.

To be more specifically, the PTC device 322 has one end coupled to a direct current power VDD and the other end coupled to one end of the resistor R1, the other end of the resistor R1 is coupled to one end of the variable resistor VR1, and the other end of the variable resistor VR1 is coupled to a grounding end. When the temperature of the cell 310 changes, the magnitude of the analog signal S1 changes accordingly. The charge/discharge speed controlling circuit 330, according to the magnitude of the analog signal S1, controls the charge/discharge circuit 340 to charge the cell 310 at different charge/discharge speeds.

Figure 6:
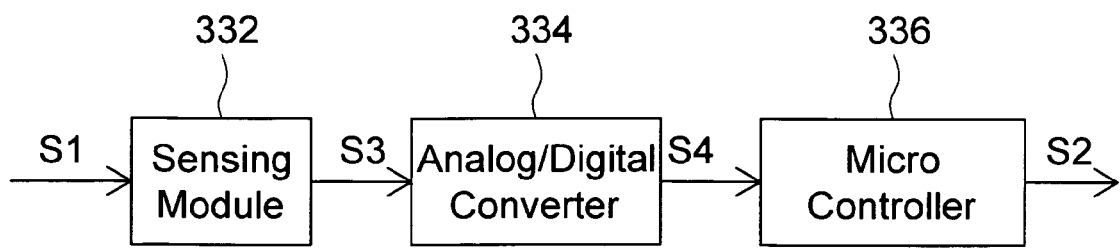
FIG. 6 is a block diagram of a charge/discharge speed controlling circuit 330.

Referring to FIG. 6, a block diagram of a charge/discharge speed controlling circuit 330 is shown. The charge/discharge speed controlling circuit 330 comprises a sensing module 332, an analog/digital converter 334 and a micro-controller 336. The analog/digital converter 334 is selectively disposed in or outside the micro-controller 336. The sensing module 332 is used for converting the analog signal S1 into an analog signal S3 and accordingly outputting the analog signal S3 to the analog/digital converter 334. The analog/digital converter 334 is for converting the analog signal S3 into a digital signal S4 and accordingly outputting the digital signal S4 to the micro-controller 336. The micro-controller 336, according to digital signal S4, outputs the control signal S2 to the charge/discharge circuit 340 to adjust a charge/discharge speed of the cell 310.

The charge/discharge speed controlling circuit 330 can merely comprise an analog/digital converter 334 and a micro-controller 336. The analog/digital converter 334 is used for converting the analog signal S1 outputted from the temperature sensing circuit 320 into a digital signal S4 and accordingly outputting the digital signal S4 to the micro-controller 336. The micro-controller 336, according to digital signal S4, outputs the control signal S2 to the charge/discharge circuit 340 to adjust a charge/discharge speed of the cell 310.

Figure 7:
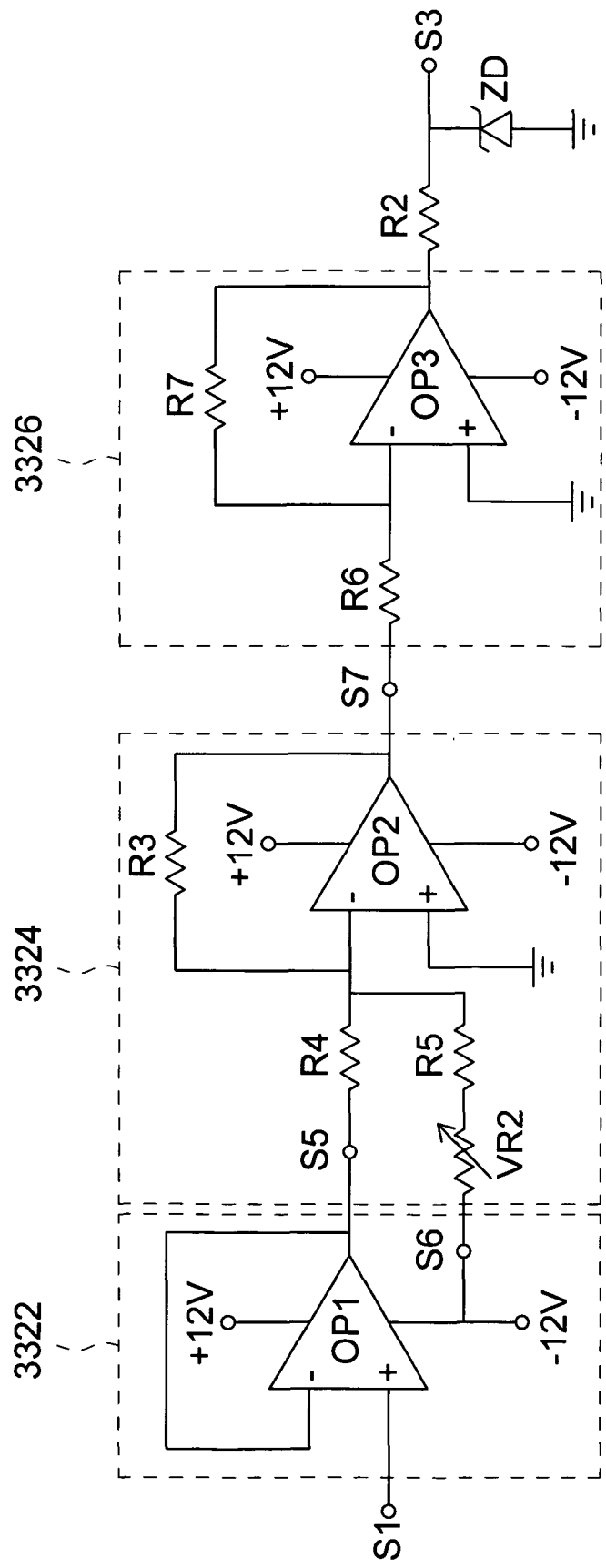
FIG. 7 is a block diagram of the sensing module 332.

Referring to FIG. 7, a block diagram of the sensing module 332 is shown. The sensing module 332 comprises a voltage follower 3322, an inverse adder 3324, an inverse amplifier 3326, a resistor R2 and a zener diode ZD. The voltage follower 3322 is coupled to the inverse amplifier 3326 via the inverse adder 3324, and the inverse amplifier 3326 is coupled to zener diode ZD via the resistor R2.

The voltage follower 3322 receives the analog signal S1 and accordingly outputs an analog signal S5. The inverse adder 3324 outputs an analog signal S7 according to the analog signal S5 and a reference signal S6. The reference signal S6 is −12V for example. The inverse amplifier 3326 is used for inversing and amplifying the analog signal S7 to output an analog signal S3.

Furthermore, the voltage follower 3322 comprises an operation amplifier OP1, and an output end of the operation amplifier OP1 is electrically connected to an inverse input end of the operation amplifier OP2. A non-inverse input end of the operation amplifier OP1 is used for receiving an analog signal S1.

The inverse adder 3324 comprises an operation amplifier OP2, a resistor R3, a resistor R4, a resistor R5 and a variable resistor VR2. The two ends of the resistor R3 are respectively coupled to an inverse input end and an output end of the operation amplifier OP2. The two ends of the resistor R4 are respectively coupled to an inverse input end the operation amplifier OP2 and an output end of the operation amplifier OP1. The variable resistor VR2 is coupled to an inverse input end of the operation amplifier OP2 via the resistor R5.

The inverse amplifier 3326 comprises an operation amplifier OP3, a resistor R6 and a resistor R7. The two ends of the resistor R6 are respectively coupled to an output end of the operation amplifier OP2 and an inverse input end of the operation amplifier OP3. The two ends of the resistor R7 are respectively coupled to an output end and an inverse input end of the operation amplifier OP3.

Figure 8:
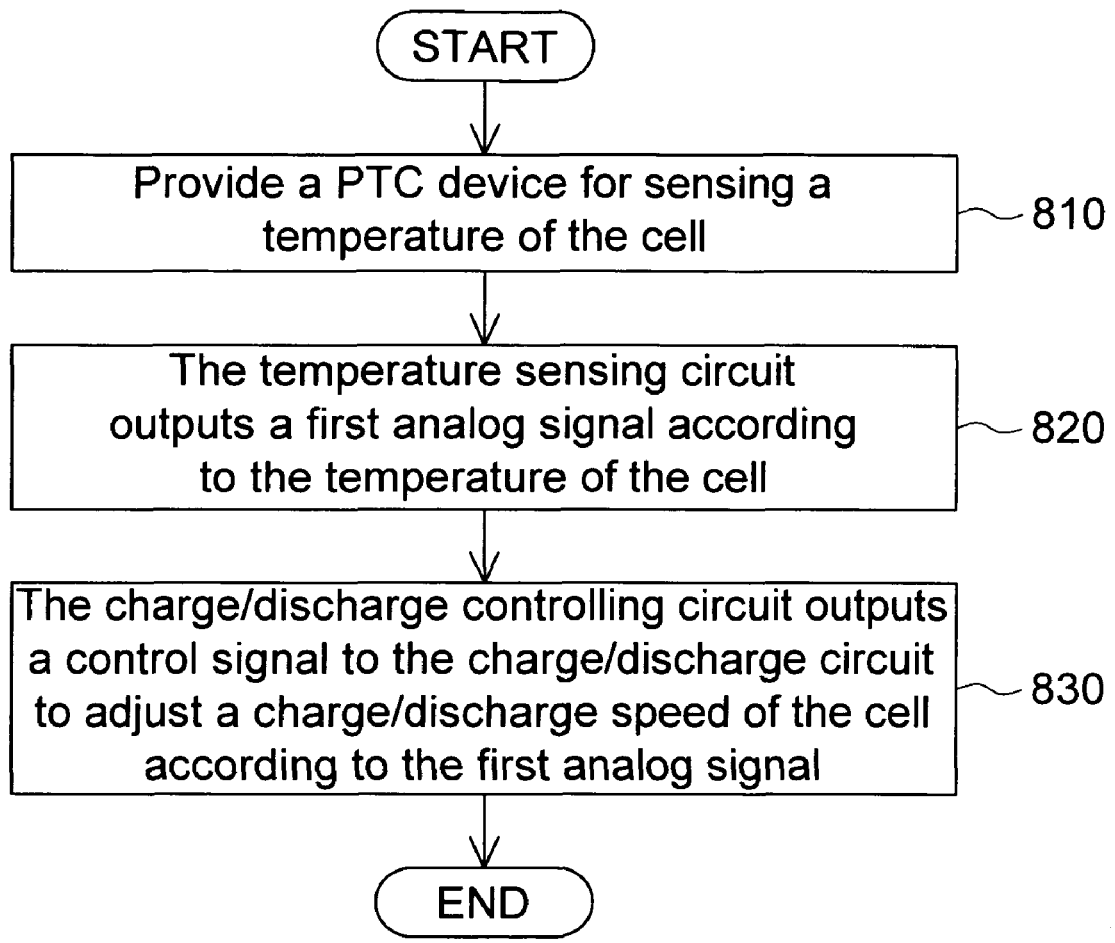
FIG. 8 is a flowchart of a charge/discharge method according to a preferred embodiment of the invention.

Referring to FIG. 8, a flowchart of a charge/discharge method according to a preferred embodiment of the invention is shown. The charge/discharge method is used in the battery module 30. The charge/discharge method comprises the following steps:

Firstly, the method begins at step 810, a PTC device 322 is provided for sensing a temperature of the cell 310. Next, the method proceeds to step 820, an analog signal S1 is outputted by the temperature sensing circuit 320 according to the temperature of the cell 310. The control signal S2 is outputted to the charge/discharge circuit 340 to adjust a charge/discharge speed of the cell 310 by the charge/discharge controlling circuit 330 according to the analog signal S1.

According to the battery module and the charge/discharge method thereof disclosed in the above embodiment of the invention, a PTC device 322 is used for sensing a temperature of the cell 310, so that a charge/discharge speed of the cell 310 is appropriately adjusted according to the temperature of the cell, not only avoiding the cell 310 being burnt due to overheat but also preventing the cell 310 from exploding, hence further improving the security of use.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A battery module, comprising:
   a cell;
   a charge/discharge circuit coupled to the cell;
   a temperature sensing circuit used for outputting a first analog signal according to a temperature of the cell, wherein the temperature sensing circuit comprises:
      a positive temperature coefficient (PTC) device used for sensing a temperature of the cell; and
      a charge/discharge speed controlling circuit used for outputting a control signal to the charge/discharge circuit to adjust a charge/discharge speed of the cell according to the first analog signal, wherein the charge/discharge speed controlling circuit comprises:
         a sensing module used for converting the first analog signal into a second analog signal, wherein the sensing module comprises;
            a voltage follower used for receiving the first analog signal and accordingly outputting a third analog signal;
            an inverse adder used for outputting a fourth analog signal according to the third analog signal and a reference signal; and
            an inverse amplifier used for inversing and amplifying the fourth analog signal to output the second analog signal;
         an analog/digital converter used for converting the second analog signal into a digital signal; and
         a micro-controller used for outputting the control signal according to the digital signal.

2. The battery module according to claim 1, wherein the analog/digital converter is disposed on the micro-controller.

3. The battery module according to claim 1, wherein the sensing module and the analog/digital converter are disposed on the micro-controller.

4. The battery module according to claim 1, wherein the inverse adder comprises:
   an operation amplifier;
   a first resistor whose two ends are respectively coupled to an inverse input end and an output end of the operation amplifier;
   a second resistor whose one end is coupled to the inverse input end of the operation amplifier;
   a third resistor; and
   a first variable resistor coupled to the inverse input end of the operation amplifier via the third resistor.

5. The battery module according to claim 1, wherein the sensing module comprises:
   a zener diode; and
   a first resistor via which the inverse amplifier is coupled to the zener diode.

6. The battery module according to claim 1, wherein the temperature sensing circuit further comprises:
   a first resistor; and
   a first variable resistor, wherein the first resistor, the first variable resistor and the positive temperature coefficient (PTC) device are connected in serial.

7. A method of charging/discharging battery module, wherein the battery module comprises a cell, a charge/discharge circuit, a temperature sensing circuit and a charge/discharge controlling circuit, the charge/discharge method comprises:
   providing a positive temperature coefficient (PTC) device for sensing a temperature of the cell;
   outputting a first analog signal by the temperature sensing circuit according to the temperature of the cell; and
   outputting a control signal to the charge/discharge circuit to adjust a charge/discharge speed of the cell by the charge/discharge controlling circuit according to the first analog signal, wherein the charge/discharge speed controlling circuit comprises: a sensing module used for converting the first analog signal into a second analog signal, an analog/digital converter used for converting the second analog signal into a digital signal, and a micro-controller used for outputting the control signal according to the digital signal, wherein the sensing module comprises: a voltage follower used for receiving the first analog signal and accordingly outputting a third analog signal, an inverse adder used for outputting a fourth analog signal according to the third analog signal and a reference signal, and an inverse amplifier used for inversing and amplifying the fourth analog signal and accordingly outputting the second analog signal.

8. The charge/discharge method according to claim 7, wherein the analog/digital converter is disposed on the micro-controller.

9. The charge/discharge method according to claim 7, wherein the sensing module and the analog/digital converter are disposed on the micro-controller.

10. The charge/discharge method according to claim 7, wherein the inverse adder comprises:
    an operation amplifier;
    a first resistor whose two ends respectively coupled to an inverse input end and an output end of the operation amplifier;
    a second resistor whose one end is coupled to the inverse input end of the operation amplifier;
    a third resistor; and
    a first variable resistor coupled to the inverse input end of the operation amplifier via the third resistor.

11. The charge/discharge method according to claim 7, wherein the sensing module comprises:
    a zener diode; and
    a first resistor via which the inverse amplifier is coupled to the zener diode.

12. The charge/discharge method according to claim 7, wherein the temperature sensing circuit further comprises:
    a first resistor; and
    a first variable resistor, wherein the first resistor, the first variable resistor, and the PTC device are connected in serial.

* * * * *